United States Patent
Endres

(10) Patent No.: US 10,641,785 B2
(45) Date of Patent: May 5, 2020

(54) WHEEL SPEED SENSOR

(71) Applicant: Continental Teves AG & Co. oHG, Frankfurt (DE)

(72) Inventor: Ralf Endres, Groß-Gerau (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 179 days.

(21) Appl. No.: 15/461,023

(22) Filed: Mar. 16, 2017

(65) Prior Publication Data
US 2017/0184623 A1    Jun. 29, 2017

Related U.S. Application Data

(63) Continuation of application No. PCT/EP2015/069565, filed on Aug. 26, 2015.

(30) Foreign Application Priority Data

Sep. 17, 2014   (DE) .................... 10 2014 218 704

(51) Int. Cl.
*G01P 1/04*    (2006.01)
*G01P 3/489*    (2006.01)
(Continued)

(52) U.S. Cl.
CPC ............ *G01P 1/04* (2013.01); *B60R 16/0231* (2013.01); *B60T 8/171* (2013.01); *B60T 8/885* (2013.01);
(Continued)

(58) Field of Classification Search
CPC ... G01P 1/04; G01P 3/36; G01P 3/489; B60R 16/0231; B60T 8/171; B60T 8/885; B60T 2270/416; B60Y 2400/3032
(Continued)

(56) References Cited

U.S. PATENT DOCUMENTS 5,129,713 A * 7/1992 Matsuda .................. B60T 8/88
303/122.05
5,406,485 A   4/1995 Wise et al.
(Continued)

FOREIGN PATENT DOCUMENTS

DE   19602243   7/1997
DE   101 46 949 A1   6/2002
(Continued)

OTHER PUBLICATIONS

Masao, Espacenet Tarnsalation JPH04366766 (a), Dec. 1992.*
(Continued)

*Primary Examiner* — Melissa J Koval
*Assistant Examiner* — Courtney G McDonnough

(57) ABSTRACT

A wheel speed sensor for a motor vehicle can be supplied with an operating voltage by a control device. The control device has a load resistance with a load resistance value. An operating voltage can be at a voltage input by the control device. An electrical circuit is designed to determine a turn-on or a turn-off voltage value according to the load resistance value. An operation control is designed to transfer the wheel speed sensor into a normal operation using the operating voltage, when the turn-on voltage value is exceeded, and to transfer the wheel speed sensor into an emergency operation using the operating voltage, when a turn-off voltage value is not met. In emergency operation only a low constant signal level is emitted.

18 Claims, 3 Drawing Sheets

(51) Int. Cl.
*B60T 8/171* (2006.01)
*B60T 8/88* (2006.01)
*B60R 16/023* (2006.01)
*G01P 3/36* (2006.01)

(52) U.S. Cl.
CPC ............... *G01P 3/36* (2013.01); *G01P 3/489* (2013.01); *B60T 2270/416* (2013.01); *B60Y 2400/3032* (2013.01)

(58) Field of Classification Search
USPC ........................................................ 324/178
See application file for complete search history.

(56) References Cited

U.S. PATENT DOCUMENTS

| | | |
|---|---|---|
| 2004/0066183 A1 | 4/2004 | Lohberg et al. |
| 2008/0036294 A1 | 2/2008 | Yamamoto et al. |
| 2010/0277224 A1 | 11/2010 | Joeckel |

FOREIGN PATENT DOCUMENTS

| | | | |
|---|---|---|---|
| DE | 102 28 664 A1 | 1/2004 | |
| DE | 10 2010 040565 A1 | 3/2012 | |
| DE | 10 2011 103172 A1 | 12/2012 | |
| EP | 1 890 159 A1 | 2/2008 | |
| JP | H04366766 A | * 12/1992 | ............... B60T 8/00 |
| JP | 2004516975 A | 6/2004 | |
| JP | 2008037404 A | 2/2008 | |

OTHER PUBLICATIONS

Lohberg et al., Espacenet Tarnsalation DE10146949 (A1) , Jun. 2002.*

International Search Report and Written Opinion dated Dec. 17, 2015 from corresponding International Patent Application No. PCT/EP2015/069565.

German Patent Office Search Report dated Mar. 3, 2015 from corresponding German Application No. 10 2014 218 704.4.

* cited by examiner

WHEEL SPEED SENSOR

CROSS-REFERENCE TO RELATED APPLICATIONS

This application claims the benefit of PCT Application PCT/EP2015/069565, filed Aug. 26, 2015, which claims priority to German Application DE 10 2014 218 704.4, filed Sep. 17, 2014. The disclosures of the above applications are incorporated herein by reference.

TECHNICAL FIELD

The present invention relates to a wheel speed sensor.

BACKGROUND

A motor vehicle often comprises a wheel speed sensor for sensing a speed of a wheel of the motor vehicle, to which sensor a control device can apply an operating voltage. In this case, the control device is often supplied with a supply voltage by the motor vehicle battery. If the motor vehicle is in the form of a hybrid motor vehicle in particular, the supply voltage provided by the motor vehicle battery is often subject to fluctuations, which can cause fluctuations in the operating voltage. This can disrupt operation of the wheel speed sensor.

In order to avoid disruption to the operation of the wheel speed sensor and therefore to avoid incorrect signals, the wheel speed sensor can be changed from normal operation to defined emergency operation, in which a functionality of the wheel speed sensor is restricted or deactivated, if the operating voltage falls below a first predetermined threshold value. The wheel speed sensor can then be changed from emergency operation back to normal operation if the operating voltage exceeds a second predetermined threshold value. In this case, the second predetermined threshold value is often selected to be greater than the first predetermined threshold value in order to avoid continuous and undesired switching between normal operation and emergency operation. However, the respective predetermined threshold values are often empirically determined, as a result of which the operation of the wheel speed sensor may be inefficient.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect, a wheel speed sensor for sensing a speed of a wheel of a motor vehicle, a control device being able to apply an operating voltage to the wheel speed sensor, and the control device having a load resistor with a load resistance value, having: a voltage input to which the control device can apply the operating voltage; an electrical circuit which is designed to determine a switch-on voltage value on the basis of the load resistance value; and an operational controller which is designed to change the wheel speed sensor to normal operation when the switch-on voltage value is reached by the operating voltage and which is designed to change the wheel speed sensor to emergency operation when a switch-off voltage value is reached by the operating voltage.

The motor vehicle may be a passenger motor vehicle, a heavy goods vehicle, an automobile, a motorcycle, an electric motor vehicle or a hybrid motor vehicle, such as a hybrid vehicle. The wheel speed sensor may also comprise a Hall sensor, a magnetoresistive sensor and/or an optical sensor. The wheel of the motor vehicle may also comprise a magnetic transducer ring and/or a perforated disk edge. Furthermore, a functionality of the wheel speed sensor may be restricted or deactivated during emergency operation of the wheel speed sensor.

The load resistance value may be an internal resistance value or a source resistance value of the control device. For example, the load resistance value is 10Ω, 20Ω, 35Ω, 50Ω, 75Ω, 100Ω, 115Ω or 300Ω. Furthermore, the wheel speed sensor may comprise a sensing device for sensing the load resistance value. The wheel speed sensor may also comprise a programming interface or an actuation element, such as a dual in-line package (DIP) switching element, for setting the load resistance value. Furthermore, the load resistance value may be prestored in a memory of the wheel speed sensor.

The operating voltage may be 1 V, 5 V, 10 V, 12 V, 15 V, 20 V, 25 V, 30 V, 35 V, 40 V, 45 V or 50 V. The switch-off voltage value may be predetermined. For example, the switch-off voltage value is 1 V, 2 V, 3 V, 4 V, 5 V, 6 V, 7 V, 8 V, 9 V or 10 V. Furthermore, the switch-on voltage value may be 0.5 V, 1 V, 2 V, 3 V, 4 V, 5 V, 10 V, 12 V, 15 V, 20 V, 25 V or 50 V.

In one embodiment, the electrical circuit is formed by a processor. Therefore, the electrical circuit can be provided in a cost-effective manner.

In another embodiment, the wheel speed sensor during emergency operation is designed to output a current having a current value which is independent of the speed, in particular a constant current value. This achieves the advantage that emergency operation can be efficiently detected by the control device.

In another embodiment, the wheel speed sensor during normal operation is designed to output a current having a current value which depends on a speed of the wheel. Therefore, the control device can efficiently sense the speed of the wheel.

In another embodiment, the electrical circuit is designed to also determine the switch-on voltage value on the basis of the switch-off voltage value. Therefore, operation of the wheel speed sensor can be further optimized.

In another embodiment, the electrical circuit is also designed to determine the switch-off voltage value on the basis of the load resistance value. Therefore, operation of the wheel speed sensor can be efficiently adapted to the control device.

In another embodiment, the electrical circuit is designed to determine the switch-on voltage value $V_{B,EIN}$ and/or the switch-off voltage value $V_{B,AUS}$ on the basis of the following formula:

$$V_{B,AUS} - V_{B,EIN} = (I_H - I_{RESET}) * R_L,$$

where $R_L$ is the load resistance value, $I_{RESET}$ is a current value which is independent of the speed, in particular a constant current value, during emergency operation of the wheel speed sensor, and $I_H$ is a maximum current value during normal operation of the wheel speed sensor. Therefore, the switch-on voltage value and/or the switch-off voltage value can be efficiently determined.

In another embodiment, the electrical circuit is designed to also determine a difference $\Delta V_B$ between the switch-on voltage value and the switch-off voltage value on the basis of the following formula:

$$\Delta V_B = (I_H - I_{RESET}) * R_L,$$

where $R_L$ is the load resistance value, $I_{RESET}$ is a current value which is independent of the speed, in particular a constant current value, during emergency operation of the wheel speed sensor, and $I_H$ is a maximum current value during normal operation of the wheel speed sensor. Therefore, the switch-on voltage value can be efficiently determined.

In another embodiment, the wheel speed sensor is designed with a programming interface for inputting the load resistance value. Therefore, the load resistance value can be efficiently set.

According to another aspect a wheel speed sensor arrangement has the wheel speed sensor and a control device which comprises a load resistor with a load resistance value, the control device being connected to the voltage input of the wheel speed sensor and being designed to apply an operating voltage to the voltage input. Therefore, a wheel speed sensor arrangement with efficient operation can be provided.

In one embodiment, the control device has an input terminal, to which an input voltage can be applied, and an output terminal for outputting the operating voltage, the output terminal being electrically connected to the voltage input. Therefore, an efficient control device can be used.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Exemplary embodiments of the invention are illustrated in the drawings and are described in more detail below. In the drawings.

DETAILED DESCRIPTION

Figure 1:
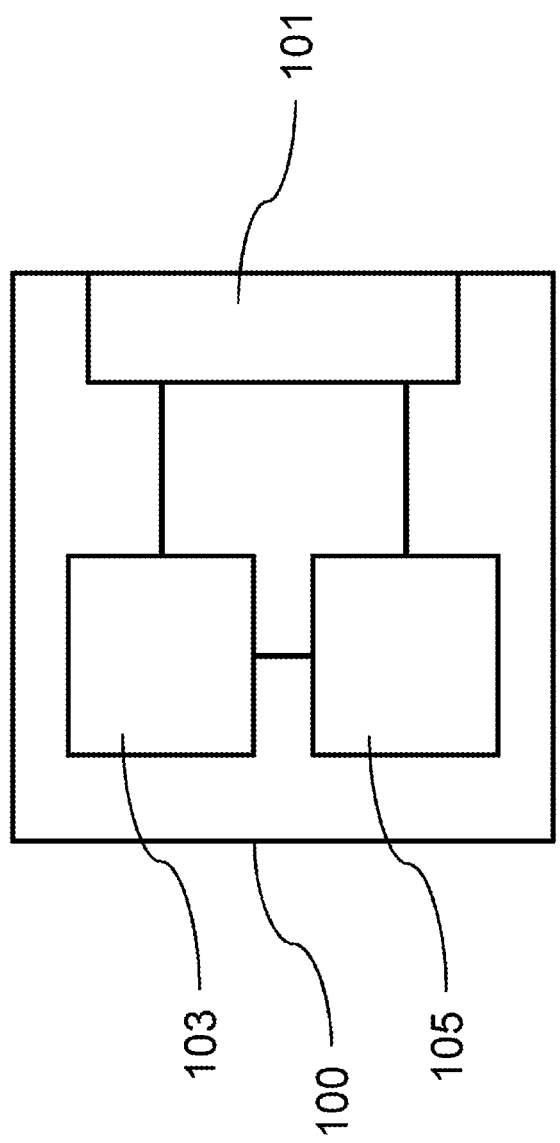
FIG. 1 shows a schematic illustration of a wheel speed sensor according to one embodiment.

FIG. 1 shows a schematic illustration of a wheel speed sensor 100 according to one embodiment. The wheel speed sensor 100 comprises a voltage input 101, an electrical circuit 103 and an operational controller 105.

The wheel speed sensor 100 for sensing a speed of a wheel of a motor vehicle, a control device being able to apply an operating voltage to the wheel speed sensor 100, and the control device having a load resistor with a load resistance value, can be designed with: the voltage input 101 to which the control device can apply the operating voltage; the electrical circuit 103 which is designed to determine a switch-on voltage value on the basis of the load resistance value; and the operational controller 105 which is designed to change the wheel speed sensor 100 to normal operation when the switch-on voltage value is reached by the operating voltage and which is designed to change the wheel speed sensor 100 to emergency operation when a switch-off voltage value is reached by the operating voltage.

The motor vehicle may be a passenger motor vehicle, a heavy goods vehicle, an automobile, a motorcycle, an electric motor vehicle or a hybrid motor vehicle, such as a hybrid vehicle. The wheel speed sensor 100 may also comprise a Hall sensor, a magnetoresistive sensor and/or an optical sensor. The wheel of the motor vehicle may also comprise a magnetic transducer ring and/or a perforated disk edge. Furthermore, a functionality of the wheel speed sensor 100 may be restricted or deactivated during emergency operation of the wheel speed sensor 100.

The load resistance value may be an internal resistance value or a source resistance value of the control device. For example, the load resistance value is 10Ω, 35Ω, 50Ω, 75Ω, 100Ω, 115Ω or 300Ω. Furthermore, the wheel speed sensor 100 may comprise a sensing device for sensing the load resistance value. The wheel speed sensor 100 may also comprise a programming interface or an actuation element, such as a dual in-line package (DIP) switching element, for setting the load resistance value. The load resistance value may also be prestored in a memory of the wheel speed sensor 100.

The operating voltage may be 1 V, 5 V, 10 V, 12 V, 15 V, 20 V, 25 V, 30 V, 35 V, 40 V, 45 V or 50 V. The switch-off voltage value may be predetermined. For example, the switch-off voltage value is 1 V, 2 V, 3 V, 4 V, 5 V, 6 V, 7 V, 8 V, 9 V or 10 V. Furthermore, the switch-on voltage value may be 0.5 V, 1 V, 2 V, 3 V, 4 V, 5 V, 10 V, 12 V, 15 V, 20 V, 25 V or 50 V.

In one embodiment, the electrical circuit 103 is formed by a processor.

In another embodiment, the wheel speed sensor 100 during emergency operation is designed to output a current having a current value which is independent of the speed, in particular a constant current value.

In another embodiment, the wheel speed sensor 100 during normal operation is designed to output a current having a current value which depends on a speed of the wheel.

Figure 2:
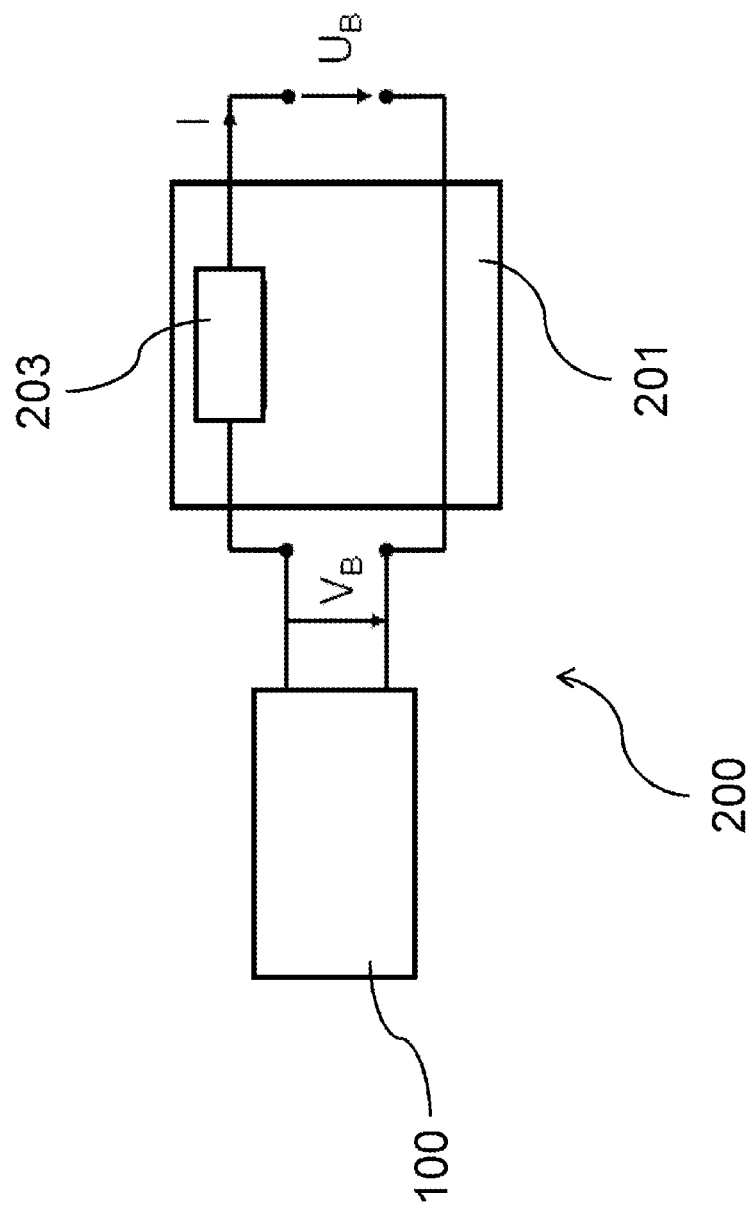
FIG. 2 shows a schematic illustration of a wheel speed sensor arrangement according to one embodiment.

FIG. 2 shows a schematic illustration of a wheel speed sensor arrangement 200 according to one embodiment. The wheel speed sensor arrangement 200 comprises the wheel speed sensor 100 and a control device 201 having a load resistor 203 which has the load resistance value $R_L$.

A voltage $V_B$ is applied between the connecting poles, such as the voltage input 101, of the wheel speed sensor 100. The entire system or the wheel speed sensor arrangement 200 is supplied with a voltage $U_B$ by a motor vehicle battery, such as a vehicle battery. The internal resistance of the control device 201 is represented by the load resistor 201 having the load resistance value $R_L$. During normal operation, a current I from the wheel speed sensor 100 is modulated onto the current levels $I_L/I_H$, as in the case of a wheel speed sensor 100 or standard sensor without a log function, or $I_L/I_M/I_H$, as in the case of a wheel speed sensor 100 having a log function.

Figure 3:
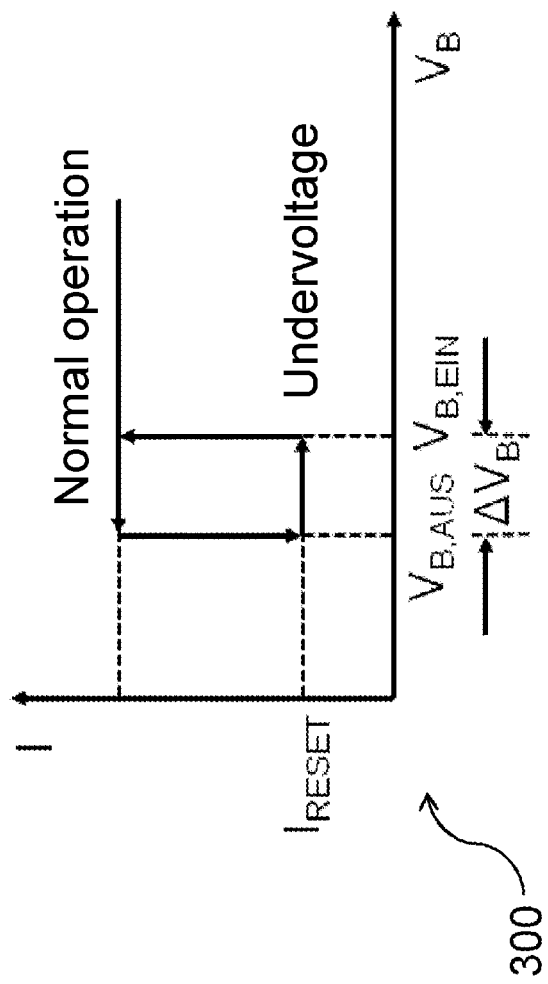
FIG. 3 shows a schematic voltage/current graph for illustrating the operating ranges of the wheel speed sensor.

FIG. 3 shows a schematic voltage/current graph 300 for illustrating the operating ranges of the wheel speed sensor 100. The voltage/current graph 300 shows the operating ranges "normal operation" and "undervoltage" of the wheel speed sensor 100, the current I being plotted against the voltage $V_B$.

If the voltage $V_B$ falls below the switch-off voltage value $V_{B,AUS}$, such as a switch-off threshold, a correct method of operation of the wheel speed sensor 100 can no longer be ensured. In order to avoid a malfunction, the wheel speed sensor 100 can change to a constant undervoltage current level $I_{RESET}$. This operating state is left again only when the voltage $V_B$ exceeds a switch-on voltage value $V_{B,EIN}$, such as a switch-on threshold. The implementation of a difference $\Delta V_B = V_{B,AUS} - V_{B,EIN}$, such as voltage hysteresis, makes it possible to avoid continuous and unwanted switching-on and switching-off of the wheel speed sensor 100 if $V_B$ is permanently in the range of the switch-off threshold $V_{B,AUS}$.

The difference $\Delta V_B$ or the voltage hysteresis depends on the load resistance $R_L$ and is calculated according to the following relationship:

$$\Delta V_B = (I_H - I_{RESET}) \cdot R_L$$

According to one embodiment, the greatest possible load resistance value $R_L$ which occurs in the application can be assumed for the interpretation of the difference $\Delta V_B$ or the voltage hysteresis in order to enable sufficient robustness of the wheel speed sensor 100 with respect to undervoltage strength. Since different control devices 201 differ in terms of their load resistance value, a wheel speed sensor 100 installed in a system having a control device 201 with a low load resistance may have a high voltage hysteresis, such as a high difference $\Delta V_B$, and a high switch-on voltage $V_{B,EIN}$.

According to another embodiment, the difference $\Delta V_B$ or the voltage hysteresis and therefore the switch-on voltage $V_{B,EIN}$ can be programmable. Therefore, the voltage hysteresis $\Delta V_B$ and therefore the switch-on voltage $V_{B,EIN}$ can be individually set for each application in a manner optimally adapted to the control device 201. This makes it possible to achieve improved robustness of the wheel speed sensor arrangement 200 or of the overall system with respect to low voltage levels.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A wheel speed sensor for a wheel of a motor vehicle, comprising:
    a control device which applies an operating voltage to the wheel speed sensor;
    a load resistor of the control device with a load resistance value;
    a voltage input to which the control device can apply the operating voltage;
    an electrical circuit to determine a switch-on voltage value on the basis of the load resistance value;
    an operational controller which changes the wheel speed sensor to normal operation when the switch-on voltage value is reached by the operating voltage and to emergency operation when a switch-off voltage value is reached by the operating voltage; and
    wherein the electrical circuit determines a difference $\Delta V_B$ between the switch-on voltage value and the switch-off voltage value on the basis of: $\Delta V_B = (I_H - I_{RESET}) * R_L$, where $R_L$ is the load resistance value, $I_{RESET}$ is a current value which is independent of the speed, during emergency operation of the wheel speed sensor, and $I_H$ is a maximum current value during normal operation of the wheel speed sensor.

2. The wheel speed sensor of claim 1, wherein during emergency operation the wheel speed sensor has a current value output which is independent of the speed.

3. The wheel speed sensor of claim 2, wherein, the wheel speed sensor current value output is a constant current value.

4. The wheel speed sensor of claim 1, wherein the electrical circuit determines the switch-on voltage value on the basis of the switch-off voltage value.

5. The wheel speed sensor of claim 1, wherein during normal operation the wheel speed sensor has a current value output which depends on a speed of the wheel.

6. The wheel speed sensor of claim 1, wherein the electrical circuit determines at least one of the switch-on voltage value $V_{B,EIN}$ and the switch-off voltage value $V_{B,AUS}$ on the basis of: $V_{B,AUS} - V_{B,EIN} = (I_H - I_{RESET}) * R_L$, where $R_L$ is the load resistance value, $I_{RESET}$ is a current value which is independent of the speed, in particular a constant current value, during emergency operation of the wheel speed sensor, and $I_H$ is a maximum current value during normal operation of the wheel speed sensor.

7. The wheel speed sensor of claim 1, further comprising a programming interface for inputting the load resistance value.

8. The wheel speed sensor of claim 1, wherein the electrical circuit determines the switch-off voltage value on the basis of the load resistance value.

9. A method for controlling a wheel speed sensor for motor vehicle, comprising:
    applying an operating voltage to a voltage input of the wheel speed sensor with a control device;
    determining a switch-on voltage value on the basis of a load resistance value of a load resistor for the control device;
    changing the wheel speed sensor to normal operation with an operational controller when the operating voltage reaches a switch-on voltage value;
    changing the wheel speed sensor to emergency operation with the operational controller when the operating voltage reaches a switch-off voltage value; and
    determining a difference $\Delta V_B$ between the switch-on voltage value and the switch-off voltage value on the basis of: $\Delta V_B = (I_H - I_{RESET}) * R_L$, where $R_L$ is the load resistance value, $I_{RESET}$ is a current value which is independent of the speed, during emergency operation of the wheel speed sensor, and $I_H$ is a maximum current value during normal operation of the wheel speed sensor.

10. The method of claim 9, wherein during emergency operation the wheel speed sensor has a current value output which is independent of the speed.

11. The method of claim 10, wherein the wheel speed sensor current value output is a constant current value.

12. The method of claim 9, wherein during normal operation the wheel speed sensor has a current value output which depends on a speed of the wheel.

13. The method of claim 9, further comprising determining the switch-on voltage value on the basis of the switch-off voltage value with an electrical circuit.

14. The method of claim 9, further comprising determining the switch-off voltage value on the basis of the load resistance value with an electrical circuit.

15. The method of claim 9, further comprising determining at least one of the switch-on voltage value $V_{B,EIN}$ and the switch-off voltage value $V_{B,AUS}$ on the basis of: $V_{B,AUS} - V_{B,EIN} = (I_H - I_{RESET}) * R_L$, where $R_L$ is the load resistance value, $I_{RESET}$ is a current value which is independent of the speed, in particular a constant current value, during emergency operation of the wheel speed sensor, and $I_H$ is a maximum current value during normal operation of the wheel speed sensor.

16. The method of claim 9, further comprising inputting the load resistance value with a programming interface.

17. The wheel speed sensor of claim 1, wherein the current value is a constant current value.

18. The method of claim 9, wherein the current value is a constant current value.

* * * * *